(12) United States Patent
Godøy et al.

(10) Patent No.: US 8,210,261 B2
(45) Date of Patent: Jul. 3, 2012

(54) METHOD OF WELL TREATMENT AND CONSTRUCTION

(75) Inventors: Rune Godøy, Stavanger (NO); Hallvar Eide, Stavanger (NO); Arild Saasen, Stavanger (NO)

(73) Assignee: Statoil ASA, Stavanger (NO)

( * ) Notice: Subject to any disclaimer, the term of this patent is extended or adjusted under 35 U.S.C. 154(b) by 527 days.

(21) Appl. No.: 11/919,367

(22) PCT Filed: Apr. 26, 2006

(86) PCT No.: PCT/GB2006/001524
§ 371 (c)(1),
(2), (4) Date: Jun. 29, 2008

(87) PCT Pub. No.: WO2006/114623
PCT Pub. Date: Nov. 2, 2006

(65) Prior Publication Data
US 2009/0277635 A1    Nov. 12, 2009

(30) Foreign Application Priority Data

Apr. 26, 2005  (GB) ................................. 0508420.7
Oct. 14, 2005  (GB) ................................. 0520981.2

(51) Int. Cl.
*E21B 33/13*   (2006.01)
*C04B 7/02*    (2006.01)
*C04B 7/14*    (2006.01)
*C04B 28/08*   (2006.01)

(52) U.S. Cl. ........ 166/292; 106/713; 106/738; 106/790; 106/817

(58) Field of Classification Search .................. None
See application file for complete search history.

(56) References Cited

U.S. PATENT DOCUMENTS

| | | | |
|---|---|---|---|
| 2,633,919 A | 4/1953 | Bauer et al. ................. 166/21 |
| 2,832,754 A | 4/1958 | Jex et al. | |
| 2,935,475 A | 5/1960 | Bernard .................. 252/8.55 |
| 2,939,839 A | 6/1960 | Brukner .................. 252/8.55 |
| 2,975,835 A | 3/1961 | Bond | |
| 3,199,590 A | 8/1965 | Young ..................... 166/295 |
| 3,250,330 A | 5/1966 | Smith, Jr. | |
| 3,286,770 A | 11/1966 | Knox et al. ................. 166/42 |
| 3,294,166 A | 12/1966 | Havenaar et al. | |
| 3,364,994 A | 1/1968 | Sterrett ................. 166/270.2 |
| 3,552,493 A | 1/1971 | Bezemer .................. 166/295 |
| 3,625,287 A | 12/1971 | Young .................... 166/295 |
| 4,074,536 A | 2/1978 | Young ....................... 61/36 |
| 4,120,842 A | 10/1978 | Harnsberger ............... 260/33.6 |
| 4,384,044 A | 5/1983 | Kim et al. | |
| 4,417,623 A | 11/1983 | Anthony ................... 166/294 |
| 4,479,543 A | 10/1984 | Kalfayan et al. ............ 166/300 |
| 4,498,538 A | 2/1985 | Watkins et al. ............. 166/295 |
| 4,506,044 A | 3/1985 | Cox et al. | |
| 4,530,956 A | 7/1985 | Ugelstad et al. | |
| 4,549,609 A | 10/1985 | Watkins et al. ............. 166/303 |
| 4,580,633 A | 4/1986 | Watkins et al. ............. 166/295 |
| 4,646,835 A | 3/1987 | Watkins et al. ............. 166/295 |
| 4,660,642 A | 4/1987 | Young ................... 166/280.2 |
| 4,689,085 A | 8/1987 | Plueddemann ........... 106/287.14 |
| 4,708,207 A | 11/1987 | Kalfayan et al. ............ 166/295 |
| 4,743,545 A | 5/1988 | Torobin | |
| 4,787,453 A | 11/1988 | Hewgill et al. ............. 166/272 |
| 4,850,745 A | 7/1989 | Hater et al. | |
| 4,905,761 A | 3/1990 | Bryant | |
| 4,938,287 A | 7/1990 | Friedman et al. ........... 166/288 |
| 5,043,364 A | 8/1991 | Moradi-Araghi et al. .... 523/130 |
| 5,083,611 A | 1/1992 | Clark et al. | |
| 5,129,458 A | 7/1992 | King et al. ................ 166/295 |
| 5,163,510 A | 11/1992 | Sunde | |
| 5,169,561 A | 12/1992 | Gentle et al. .............. 252/321 |
| 5,250,201 A | 10/1993 | Shilo et al. | |
| 5,297,625 A | 3/1994 | Premuzic et al. | |
| 5,337,820 A | 8/1994 | Jenneman et al. | |
| 5,376,183 A | 12/1994 | Gatt et al. | |
| 5,379,841 A | 1/1995 | Pusch et al. .............. 166/295 |
| 5,530,095 A | 6/1996 | Vaughn et al. | |
| 5,701,956 A | 12/1997 | Hardy et al. ............... 166/295 |
| 5,735,349 A | 4/1998 | Dawson et al. ............. 166/295 |
| 5,806,593 A | 9/1998 | Surles ..................... 166/270 |
| 6,024,791 A | 2/2000 | Sonoda et al. .............. 106/714 |
| 6,169,058 B1 | 1/2001 | Le et al. .................... 507/222 |
| 6,210,476 B1 | 4/2001 | Chatterji et al. ............. 106/677 |
| 6,228,812 B1 | 5/2001 | Dawson et al. ............. 507/221 |
| 6,401,819 B1 | 6/2002 | Harris et al. | |
| 6,474,413 B1 | 11/2002 | Barbosa et al. ............. 166/270 |
| 6,476,169 B1 | 11/2002 | Eoff et al. ................. 526/307.2 |
| 6,702,044 B2 | 3/2004 | Reddy et al. ................ 175/64 |
| 7,325,603 B2 | 2/2008 | Kotlar et al. ............... 166/246 |

(Continued)

FOREIGN PATENT DOCUMENTS

AU    2005254780    6/2005

(Continued)

OTHER PUBLICATIONS

PCT/GB2006/001524, Oct. 13, 2006, International Search Report.

(Continued)

*Primary Examiner* — Zakiya W Bates
(74) *Attorney, Agent, or Firm* — Ballard Spahr LLP

(57) ABSTRACT

A method of well construction or treatment comprising the introduction of a settable cement that contains pulverulent aplite down a borehole is provided, together with a cement composition comprising at least 30% by weight of cement pulverulent aplite on a dry solid basis.

41 Claims, No Drawings

U.S. PATENT DOCUMENTS

| | | | |
|---|---|---|---|
| 7,922,893 B2 | 4/2011 | Busche et al. | 208/46 |
| 7,964,539 B2 | 6/2011 | Kotlar | 507/233 |
| 2002/0104651 A1 | 8/2002 | McClung | |
| 2002/0123433 A1 | 9/2002 | Goodhue, Jr. et al. | 507/140 |
| 2003/0131764 A1 | 7/2003 | Lessard et al. | 106/817 |
| 2003/0216263 A1 | 11/2003 | Tibbles et al. | |
| 2004/0177957 A1 | 9/2004 | Kalfayan et al. | 166/270 |
| 2005/0173116 A1 | 8/2005 | Nguyen et al. | 166/280.2 |
| 2007/0158070 A1 | 7/2007 | Endres et al. | 166/294 |

FOREIGN PATENT DOCUMENTS

| | | |
|---|---|---|
| AU | 2005254781 | 6/2005 |
| AU | 2006238942 | 4/2006 |
| CA | 2569770 | 6/2005 |
| CA | 2569782 | 6/2005 |
| CA | 2604220 | 4/2006 |
| CN | 1472157 A | 2/2004 |
| CN | 200680014248.7 | 4/2006 |
| EA | 200602213 | 6/2005 |
| EA | 200602214 | 6/2005 |
| EA | 200702078 | 4/2006 |
| EP | 0 003 905 | 9/1979 |
| EP | 0 224 346 | 3/1986 |
| EP | 0 187 092 | 7/1986 |
| EP | 0 193 369 | 9/1986 |
| EP | 0 265 563 | 10/1986 |
| EP | 0 266 043 | 4/1988 |
| EP | 0 365 390 | 4/1990 |
| EP | 0 656 459 | 6/1995 |
| EP | 0 692 464 | 1/1996 |
| EP | 1 235 974 | 1/2005 |
| EP | 2006726911 | 4/2006 |
| GB | 1 021 528 | 3/1966 |
| GB | 1 022 742 | 3/1966 |
| GB | 1 511 589 | 5/1978 |
| GB | 2 222 420 | 3/1990 |
| GB | 2 290 096 | 12/1995 |
| GB | 0112343.9 | 5/2001 |
| GB | 2 377 930 | 1/2003 |
| GB | 2 387 613 | 10/2003 |
| GB | 0329038.4 | 12/2003 |
| GB | 0413584.4 | 6/2004 |
| GB | 2 399 364 | 9/2004 |
| GB | 0424085.9 | 10/2004 |
| GB | 0502171.2 | 2/2005 |
| GB | 508420.7 | 4/2005 |
| GB | 520981.2 | 10/2005 |
| GB | 2 425 531 | 11/2006 |
| GB | 0712395.3 | 6/2007 |
| GB | 0716784.4 | 8/2007 |
| JP | 72033048 B * | 8/1972 |
| KR | 20020044733 | 6/2002 |
| KR | 20030071279 | 9/2003 |
| MX | MX/A/2007/013262 | 4/2006 |
| SU | 1 025 868 | 6/1983 |
| SU | 1 661 379 | 7/1991 |
| WO | WO 88/00948 | 2/1988 |
| WO | WO 92/17413 | 10/1992 |
| WO | WO 96/27070 | 9/1996 |
| WO | WO 97/45625 | 12/1997 |
| WO | WO 98/27314 | 6/1998 |
| WO | WO 99/03666 | 1/1999 |
| WO | WO 99/19375 | 4/1999 |
| WO | WO 99/54592 | 10/1999 |
| WO | WO 01/34939 | 5/2001 |
| WO | PCT/GB02/02359 | 5/2002 |
| WO | WO 02/095187 | 11/2002 |
| WO | WO 03/010107 | 2/2003 |
| WO | WO 03/087010 | 10/2003 |
| WO | WO 2005/005773 | 1/2005 |
| WO | WO 2005/073278 | 2/2005 |
| WO | WO 2005/024175 | 3/2005 |
| WO | PCT/GB2005/002385 | 6/2005 |
| WO | PCT/GB2005/02390 | 6/2005 |
| WO | WO 2005/124099 | 12/2005 |
| WO | WO 2005/124100 | 12/2005 |
| WO | PCT/GB2006/001524 | 4/2006 |
| WO | WO 2006/114623 | 11/2006 |
| WO | WO 2006/118467 | 11/2006 |
| WO | WO 2007/033489 | 3/2007 |
| WO | PCT/GB2008/002209 | 6/2008 |
| WO | PCT/GB2008/002912 | 8/2008 |
| WO | WO 2009/001098 | 12/2008 |
| WO | WO 2009/027680 | 3/2009 |

OTHER PUBLICATIONS

PCT/GB2006/001524, Oct. 13, 2006, Written Opinion.
CN200680014248.7, First Office Action.
Lea, "The Chemistry of Cement and Concrete", $3^{rd}$ Edition, pp. 31, 121, 132, 416, 560, 621, 657.
Saasen et al, SPE28821, European Petroleum Conference, London, UK, Oct. 25-27, 1994.
International Preliminary Report on Patentability for International Patent Application No. PCT/GB2005/002385 (completed Apr. 3, 2006).
International Preliminary Report on Patentability for International Patent Application No. PCT/GB2005/002390 (completed May 30, 2006).
International Search Report for International Patent Application No. PCT/GB2005/002385 (mailed Nov. 18, 2005).
International Search Report for International Patent Application No. PCT/GB2005/002390 (mailed Nov. 18, 2005).
International Search Report for International Patent Application No. PCT/GB2008/002912 (mailed Dec. 8, 2008).
Research Disclosure Journal, "Method for the consolidation of incompetent formations," Anonymously Disclosed (Jan. 1995).
Written Opinion for International Patent Application No. PCT/GB2005/002385 (mailed Nov. 18, 2005).
Written Opinion for International Patent Application No. PCT/GB2005/002390 (mailed Nov. 18, 2005).
Cannio et al. (1998) An autonomously replicating transforming vector for Sulfolobus solfataricus. J. Bacteriol., 180(12): 3237-3240.
Ornek et al. (2002) Pitting corrosion inhibition of aluminum 2024 by Bacillius biofilms secreting polyaspartate of gamma-polyglutamate. Appl. Microbiol. Biotechnol. 58(5): 651-657.
Search Report issued on Oct. 26, 2009 for EA 200802357, which was filed on Jun. 17, 2005 (Applicant—Statoil ASA; Inventor—Kotlar et al.)
PCT/GB2006/001524, dated Oct. 13, 2006, International Search Report.
PCT/GB2006/00154, dated Oct. 13, 2006, Written Opinion.
CN200680014248.7, dated Dec. 18, 2000, First Office Action.
Collins IR. Scale Inhibition by Poly(amino acids). Shared Petrotechnical Resource, Chertsey Road, Sunbury-on-Thames, Middlesex T16 7LN.
Cannio et al. (1998) An autonomously replicating transforming vector for Sulfolobus solfataricus J. Bacteriol., 180(12): 3237-3240.
McGovern-Traa et al. (1997) Petroleum Geology of the Irish Sea and Adjacent areas. Geological Society Special publication 124: 229-236.
Ornek et al. (2002) Pitting corrosion inhibition of aluminum 2024 by Bacillius biofilms secreting polyaspartate or gamma-polyglutamate. Appl. Microbiol. Biotechnol. 58(5): 651-657.
Search Report issued on Oct. 26, 2009 for EA 200802357, which was filed on Jun. 17, 2005 (Applicant—Statoil Asa; Inventor—Kotlar et al. ).
Summary of Examiner Interview issued Nov. 24, 2010 in U.S. Appl. No. 11/629,636, which was filed Jun. 17, 2005 (Inventor: H.K. Kotlar).
Response after Final Office Action filed Nov. 19, 2010 in U.S. Appl. No. 11/629,636, which was filed Jun. 17, 2005 (Inventor: H.K. Kotlar).
Final Office Action issued Jul. 23, 2010 in U.S. Appl. No. 11/629,636, which was filed Jun. 17, 2005 (Inventor: H.K. Kotlar).
Response after Non-Final Office Action filed Apr. 23, 2010 in U.S. Appl. No. 11/629,636, which was filed Jun. 17, 2005 (Inventor: H.K. Kotlar).
Non-Final Office Action issued Oct. 23, 2009 in U.S. Appl. No. 11/629,636, which was filed Jun. 17, 2005 (Inventor: H.K. Kotlar).

Response after Non-Final Office Action filed Jun. 23, 2009 in U.S. Appl. No. 11/629,636, which was filed Jun. 17, 2005 (Inventor: H.K. Kotlar).
Non-Final Office Action issued Dec. 23, 2008 in U.S. Appl. No. 11/629,636, which was filed Jun. 17, 2005 (Inventor: H.K. Kotlar).
Preliminary Amendment filed Dec. 15, 2006 in U.S. Appl. No. 11/629,636, which was filed Jun. 17, 2005 (Inventor: H.K. Kotlar).
Restriction Requirement issued Dec. 27, 2010 in U.S. Appl. No. 12/452,259, which was filed Jun. 26, 2008 (Inventors: H.K. Kotlar).
Preliminary Amendment filed Dec. 22, 2009 in U.S. Appl. No. 12/452,259, which was filed Jun. 26, 2008 (Inventors: H.K. Kotlar).
International Search Report issued Mar. 4, 2009 for PCT/GB2008/002209, which was filed on Jun. 26, 2008 and published as WO 2009/001098 on Dec. 31, 2008 (Inventor—H.K. Kotlar; Applicant—Statoilhydro Asa).
International Preliminary Report on Patentability issued Jun. 24, 2009 for PCT/GB2008/002209, which was filed on Jun. 26, 2008 and published as WO 2009/001098 on Dec. 31, 2008 (Inventor—H.K. Kotlar; Applicant—Statoilhydro Asa).
Written Opinion issued Dec. 29, 2009 for PCT/GB2008/002209, which was filed on Jun. 26, 2008 and published as WO 2009/001098 on Dec. 31, 2008 (Inventor—H.K. Kotlar; Applicant—Statoilhydro Asa).
Issue Notification issued Jan. 16, 2008 in U.S. Appl. No. 10/478,776, which was filed May 24, 2002 (Inventors—Kotlar et al.).
Notice of Allowance issued Nov. 30, 2007 in U.S. Appl. No. 10/478,776, which was filed May 24, 2002 (Inventors—Kotlar et al.).
Notice of Allowance issued Aug. 30, 2007 in U.S. Appl. No. 10/478,776, which was filed May 24, 2002 (Inventors—Kotlar et al.).
Response after Final Office Action filed May 27, 2010 in U.S. Appl. No. 11/629,729, which was filed Jun. 17, 2005 (Inventors—Kotlar et al.).
Final Office Action issued Jan. 27, 2010 in U.S. Appl. No. 11/629,729, which was filed Jun. 17, 2005 (Inventors—Kotlar et al.).
Response after Non-Final Office Action filed Nov. 12, 2009 in U.S. Appl. No. 11/629,729, which was filed Jun. 17, 2005 (Inventors—Kotlar et al.).
Non-Final Office Action issued May 12, 2009 in U.S. Appl. No. 11/629,729, which was filed Jun. 17, 2005 (Inventors—Kotlar et al.).
Response after Non-Final Office Action filed Jan. 9, 2009 in U.S. Appl. No. 11/629,729, which was filed Jun. 17, 2005 (Inventors—Kotlar et al.).
Non-Final Office Action issued Jul. 9, 2008 in U.S. Appl. No. 11/629,729, which was filed Jun. 17, 2005 (Inventors—Kotlar et al.).
Response to Restriction Requirement filed May 19, 2008 in U.S. Appl. No. 11/629,729, which was filed Jun. 17, 2005 (Inventors—Kotlar et al.).
Restriction Requirement issued Mar. 19, 2008 in U.S. Appl. No. 11/629,729, which was filed Jun. 17, 2005 (Inventors—Kotlar et al.).
Preliminary Amendment filed Dec. 5, 2006 in U.S. Appl. No. 11/629,729, which was filed Jun. 17, 2005 (Inventors—Kotlar et al.).
Search Report issued Oct. 1, 2007 for GB 0712395.3, which was filed Jun. 26, 2007 (Applicant—Statoilhydro Asa; Inventor—H.K. Kotlar).
International Preliminary Report on Patentability issued on Mar. 2, 2010 for PCT/GB2008/002912, which was filed on Aug. 29, 2008 and published as Mar. 5, 2009 on WO 2009/027680 (Applicant—Statoilhydro Asa; Inventors—Kotlar et al).
Written Opinion issued on Feb. 28, 2008 for PCT/GB2008/002912, which was filed on Aug. 29, 2008 and published as Mar. 5, 2009 on WO 2009/027680 (Applicant—Statoilhydro Asa; Inventors—Kotlar et al).
Non-Final Office Action issued Nov. 2, 2011 in U.S. Appl. No. 12/452,259, which was filed Jun. 26, 2008 (Inventors: H.K. Kotlar).
Supplemental Response to Non-Final Office Action filed on Sep. 26, 2011, in U.S. Appl. No. 12/452,259, which was filed Jun. 26, 2008 (Inventors: H.K. Kotlar).
Response to Non-Final Office Action filed on Sep. 6, 2011, in U.S. Appl. No. 12/452,259, which was filed Jun. 26, 2008 (Inventors: H.K. Kotlar).
Non-Final Office Action issued Mar. 3, 2011 in U.S. Appl. No. 12/452,259, which was filed Jun. 26, 2008 (Inventors: H.K. Kotlar).
Final Office Action issued Dec. 19, 2011 in U.S. Appl. No. 11/629,729, which was filed Jun. 17, 2005 (Inventors—Kotlar et al.).
Response to Non-Final Office Action filed on Dec. 9, 2011 in U.S. Appl. No. 11/629,729, which was filed Jun. 17, 2005 (Inventors—Kotlar et al.).
Non-Final Office Action issued Aug. 9, 2011 in U.S. Appl. No. 11/629,729, which was filed Jun. 17, 2005 (Inventors—Kotlar et al.).
Issue Notification issued Jun. 1, 2011 in U.S. Appl. No. 11/629,636, which was filed Jun. 17, 2005 (Inventors—Kotlar et al.).
Notice of Allowance issued Feb. 11, 2011 in U.S. Appl. No. 11/629,636, which was filed Jun. 17, 2005 (Inventors—Kotlar et al.).
"What are oil sands and heavy oil?", Retrieved Oct. 28, 2011, from http://www.centreforenergy.com/Ab outEnergy/ONG/OilsandsHeavyOil/Overview.asp (cited in U.S. Appl. No. 12/452,259, in the Non-Final Office Action issued Nov. 2, 2011).

* cited by examiner

METHOD OF WELL TREATMENT AND CONSTRUCTION

CROSS-REFERENCE TO RELATED APPLICATIONS

The present application is a National Phase Application of International Application No. PCT/GB2006/001524, filed Apr. 26, 2006, which claims priority to Great Britain Patent Application No. 0508420.7, filed Apr. 26, 2005, and Great Britain Patent Application No. 0520981.2, filed Oct. 14, 2005, which applications are incorporated herein fully by this reference.

This invention relates to improvements in and relating to methods of well construction and permanent plugging and abandonment of wells, in particular methods of construction and permanent plugging and abandonment of geothermal wells and wells for hydrocarbon extraction, as well as to cements, cement compositions, and cement additives for use in such methods.

When a well is constructed, after drilling has taken place, a cylindrical metal tube, the casing or liner, is placed in the borehole and the space between the outer wall of the tube and the inner wall of the borehole is filled with cement. In this way different zones are isolated and escape of fluid, e.g. water, gas or oil, along the well bore is prevented. Cement is also used for permanent plugging and abandonment of wells. Down hole cementing is described for example in "Well Cementing" edited by E. B. Nelson, Schlumberger Educational Services, Sugar Land, Tex., USA, 1990.

It is highly desirable that the cement used in well construction or plugging and abandonment should maintain its mechanical integrity and its bond to the casing or liner and the inner wall of the borehole.

The cements conventionally used down-hole often contain silica flour, e.g. as about 35% bwoc (by weight of cement) of a silica flour/Portland cement mixture, to achieve the desired mechanical properties down-hole, e.g. compressive strength in case of later exposure to higher temperatures. However, the use of cements containing silica flour is known to cause problems at certain conditions, e.g. at lower down-hole temperatures, when setting kick-off plugs etc. At such conditions many different dry cements may be required at the well site, which leads to logistic challenges.

The temperature and pressure experienced by the casing/liner varies through the life of the well and these can affect the bonding of the cement as can the shrinkage of the cement which occurs naturally. Cycling of temperature and pressure during the life of the well tales place through, e.g., pressure testing, production, injection/stimulation, workovers etc. Exposure of set Portland cements to carbon dioxide is also known to lead to cement corrosion. The more porous the set cement is, the higher will be the corrosion rate and loss of zonal isolation. Complex cement systems may be used, in particular at down-hole locations where the temperature and pressure are high or expected to go through a high degree of cycling, and/or exposure to carbon dioxide will take place. These complex and costly cement systems could involve use of many different additives, special equipment, many different cement blends, additional operating personnel etc.

There is thus a need for a cement composition which gives sufficient long term properties when applied down-hole and at the same time can be used for as many of the relevant well cementing applications as possible, e.g. at high pressure/temperature, at low pressure/temperature, in carbon dioxide environments, as lost circulation material, as plugging and abandonment material, as kick-off plug material etc.

We have now found that such improved properties may be achieved by including pulverulent aplite as a component in the cement to be applied down-hole.

Thus viewed from one aspect the invention provides a method of well construction or treatment which comprises introducing a setable cement composition down a borehole, characterized in that said composition contains pulverulent aplite.

Carbon fibre added to well cement may be used to affect several important properties thereof. The most essential of these properties are those related to the set cement, but also in the fluid state, carbon fibres in the cement may increase the ability of the cement to reduce fluid losses to the rock formation. Fluid loss is often a problem during well cementing operations, since the cement often has a higher density than the drilling fluid it displaces. The carbon fibres might in some cases bridge the small fractures causing the losses, and thus lessen the losses during the pumping operation.

More important are the properties of the set cement, since the carbon fibres will effect properties such as compressive strength, tensile strength and bond to casing/formation. Compressive strength is important, but even more important is the increased tensile strength the carbon fibres will give the set cement. Temperature- and pressure-cycling in a well is especially critical for the set cement, since it causes the casing/tube to expand/contract. This movement of the casing is known to cause the set cement to fail, causing poor zonal isolation along the wellbore. By using carbon fibres together with aplite in a well cement, the most critical mechanical properties can be controlled for optimum zonal isolation.

Thus, a further aspect of the invention provides a method of well construction or treatment which comprises introducing a setable cement composition down a borehole, characterized in that said composition contains pulverulent aplite and carbon fibres.

Suitable carbon fibres for use in the invention include those from Devold AMT AS, N-6030 Langevåg, Norway. Preferably the carbon fibres are between 0.1 cm and 10.0 cm in length, more preferably between 0.3 cm and 2.5 cm especially preferably between 0.5 cm and 1.0 cm. Preferred fibres have a diameter of between 1 µm and 15 µm, preferably between 3 µm and 10 µm, more especially between 6 µm and 8 µm, particularly 7 µm. The amount of fibre added per $m^3$ of cement mix (i.e. cement plus aplite, or cement plus aplite plus blast furnace slag) is preferably 0.1 kg to 10 kg, more preferably 0.3 kg to 7 kg, especially preferably 0.5 $kg/m^3$ to 5 $kg/m^3$.

The term well as used herein means a well for extraction of fluids from below the earth's surface or for the subsurface injection of fluids. Typically such wells will be for water or hydrocarbon (e.g. gas or oil) extraction or for injection of water, carbon dioxide or hydrocarbon gas, especially for introduction of carbon dioxide.

By setable as used herein it is meant that the composition is capable of setting down-hole following its application either with or without intervention. Intervention in this regard might typically involve addition of a catalyst or a pH modifier following placement of the cement composition. Where the intervention required involves addition of a further material, e.g. a pH modifier, the compositions are referred to herein as "non-self-setable".

Aplite is a granitoid mineral found for example in Montpelier, Va., USA, Owens Valley, Calif., USA and in Finnvolldalen in Norway as well as in Japan, Russia and Tuscany, Italy. Aplite is currently used almost exclusively as a flux in single-fired ceramic tile production. Aplite may be obtained commercially, e.g. from Maffei Natural Resources, Italy and the US Silica Company, West Virginia, USA. Typically aplite contains silicon, magnesium, iron, sodium, aluminium, potassium, titanium and calcium with the major components (expressed as oxide content) being silicon and aluminium, these generally being present at 60-85% wt. and 10 to 25% wt. respectively.

The aplite used according to the present invention is preferably a high silicon content aplite, e.g. with a silicon content (expressed as oxide content) of at least 68% wt., more preferably at least 70% wt., especially at least 75% wt. The aplite from Finnvolldalen in Norway which has a silicon content (expressed as oxide content) of about 80% wt. is especially preferred.

The silicon content is expressed as an oxide content as it is standard geological practice to express elemental contents in this fashion. Thus for example the US Silica Company provides a typical chemical analysis for its aplite (from Montpelier) of $SiO_2$ 62.0%, $Fe_2O_3$ 0.18%, $Al_2O_3$ 21.7%, $TiO_2$ 0.30%, CaO 5.6%, MgO 0.034%, $Na_2O$ 5.5%, $K_2O$ 2.9%, $P_2O_5$ 0.22% and LOI (loss on ignition) 0.1%.

The pulverulent aplite used according to the invention preferably has a particle size of less than 200 µm, more preferably less than 100 µm, e.g. 1 to 100 µm, more typically 10 to 100 µm, e.g. 50 to 100 µm, especially less than 75 µm. Particle size in this regard may be measured by screening or using particle size measuring apparatus. Where it is stated that the particle size is less than a certain value, then normally at least 50% volume will be that size or smaller, preferably at least 80% volume. Alternatively particle size may be taken to be mode particle size as measured by a particle size analyser, e.g. a Coulter particle size analyser. Coarse aplite may be transformed into finer grained aplite by conventional rock pulverizing techniques, optionally followed by screening to separate out oversized and/or undersized grains.

On a dry solids basis, the pulverulent aplite additive preferably constitutes at least 10% bwoc (i.e. "by weight of cement", i.e. by weight relative to the basic composition which is capable of forming a cement), more preferably at least 30% bwoc, especially at least 35% bwoc, more especially at least 50% bwoc, for example up to 400% bwoc and even higher concentrations by weight of cement, more typically up to 200% bwoc, e.g. at least 100% bwoc. Typically the aplite will constitute no more than 85% wt., for example no more than 65% wt., preferably no more than 60% wt., more preferably no more than 55% wt., of the setable cement composition on a dry solids basis.

Such high aplite content cement compositions are themselves new and form a further aspect of the present invention. Thus viewed from a further aspect the invention provides a cement composition comprising at least 30% bwoc (for example 30 to 400% bwoc) pulverulent aplite on a dry solids basis, preferably at least 35% bwoc, more especially at least 50% bwoc, e.g. 40 to 200% bwoc, e.g. in dry powder mixture or aqueous slurry form.

Compositions containing at least 100% bwoc aplite, e.g. 125 to 200% bwoc, are especially interesting as they are suitable for both low and high temperature usage. Currently different cements have to be used for different depths and temperatures.

The use of finely pulverulent aplite in cements is also new and forms a further aspect of the invention. Viewed from this aspect the invention provides a cement composition containing aplite having a particle size of less than 200 µm, preferably less than 100 µm, e.g. 50 to 100 µm, especially less than 75 µm, for example at least 10% bwoc on a dry solids basis, preferably at least 30% bwoc, especially 30 to 400% bwoc.

The basic cement composition, i.e. the cement base in the compositions used according to the invention, may be any cement capable of use in down-hole conditions, for example Portland cement or other conventional cements. Such cement compositions are widely available and have been written about extensively.

While aplite is a well understood geological term, it should be emphasized herein that other granitoid rocks having the same or similar cement-shrinkage reducing effect, relative to silica, may be used according to the invention in place of materials formally recognised as aplites and that such usage is considered to be according to the invention, although less preferred than the use of materials recognised as aplites.

In addition to aplite, other pulverulent silicates, e.g. silica, in particular silica flour, may also be used in the cement compositions according to the invention. Typically the weight ratio of non-aplite silicate to aplite will be in the range of 0:100 to 90:10, more particularly 2:98 to 70:30, especially 10:90 to 30:70. The use of a non-aplite silicate in addition to aplite is especially preferred when the aplite content is relatively low.

As mentioned above, a primary function of the inclusion of aplite is to reduce cement shrinkage on setting. In the absence of aplite, shrinkage may be as high as 4% vol. With 40% bwoc aplite this has been shown to be reduced to 1.2% vol. and at 50% bwoc aplite to 0.7% vol. (tested after 68 hours of curing at 150° C.). Such low-shrinkage cements form a preferred embodiment of the invention and in this embodiment the aplite-containing cements of the invention may have a shrinkage on setting of less than 3% by volume. This shrinkage will preferably be less than 2.5%, more preferably less than 2.0% and most preferably less than 2%.

A further considerable advantage of the cements of the present invention is the very low porosity and/or very low permeability of the resulting set cement compositions. Reduced permeability will reduce the invasion of any fluid or gas (e.g. $CO_2$) and will thus reduce the corrosion of the cement and the transfer of gas or fluid across the cement plug or wall. The water permeability of set Portland cement with slurry density of 1.90 SG (similar to the aplite free cement composition in Example 3) is around 0.0010 mD (millidarcies), and increases as density is reduced. If reduced to 1.44 SG the water permeability increases to approximately 0.1380 mD. API Spec. 10, section 11.4 describes how these permeability tests are performed and will be familiar to one of skill in the art.

The aplite-containing cements of the present invention have reduced permeability in comparison with non-aplite containing equivalents. For example, aplite in a Portland cement reduces the permeability over a Portland cement composition of equivalent density. This decreased permeability thereby reduces the invasion of any fluid or gas which will cause cement corrosion and/or loss of zonal isolation.

In a preferred embodiment, the aplite-containing cements of the present invention thus have a lower permeability once set, according to API Spec. 10, section 11.4, than the equivalent set cement prepared in the absence of aplite, and/or the equivalent set cement containing an equivalent quantity of silica flour in place of the aplite component. In this embodiment, the porosity of a cement of density 1.9 SG is typically no more than 0.0005 mD, preferably no more than 0.0003 mD and more preferably no more than 0.0002 mD. Such an absolute or comparative test will easily be carried out according to the known standard.

Aplite (and pulverulent silicate) content in the cement compositions of the invention is defined, as is normal in the industry, as a percentage by dry weight relative to the basic cement composition, e.g. a Portland cement composition, i.e. excluding other additives such as colorants, antimicrobials, organic polymers, fibres, (e.g. inorganic fibres such as glass or "rock wool" fibres), etc. Such other additives, with the exception of additives significantly contributing to the structural (e.g. load-bearing) properties of the set cement, such as silica, will generally contribute no more than 10% wt. dsb to the total cement composition, typically less than 5% wt. Besides such additives, the cement composition comprises a cement base, i.e. a material capable of setting to form a cement, more particularly an inorganic cement base. Cement bases, such as Portland cement, are well known in the technological field and require no further description here. Cements are discussed for example in Lea, "The Chemistry of Cement and Concrete", 3rd Edition, Edward Arnold, Old Woking, UK, 1970, and Taylor, "Cement Chemistry", Academic Press, London, UK, 1990.

In a particular embodiment of the invention, blast furnace slag (BFS) may be used as all or as part (e.g. from close to 0 (e.g. 2%) to nearly 100% wt (e.g. 90 wt %)) of the cement base. The use of BFS in down-hole cementing applications is discussed for example by Saasen et al in SPE28821, a paper presented at the European Petroleum Conference, London, UK, 25-27 Oct. 1994. BFS is useful in particular as the base for non-self-curing cement compositions, i.e. compositions which can be placed in situ before a further action is taken to initiate setting, e.g. addition of a pH modifier, more specifically an alkaline agent. For down-hole applications, the non-self curing cement composition is applied separately from the curing initiator. For example, the cement composition may be pumped into place before the curing initiator is added or released (e.g. the activator may be placed in the desired location prior to addition of the cement, such as by release from the surface of the metal pipe etc.), e.g. to bring the pH to above about 9.0. If the cement base is only partly BFS, e.g. with the balance provided by Portland cement, the use of an activator may be unnecessary as the material forming the balance may function as the activator.

Where the cement base is wholly or largely BFS (e.g. greater than 80%, especially greater than 90%, and particularly essentially 100%), the concentration of aplite may be any non-zero concentration but will typically be in the proportions described supra. In particular, the amount of aplite used in this embodiment of the invention may be above 30% by weight of cement base (BPS).

BPS-based cement compositions are currently of particular interest for use in down-hole locations where high temperatures may be encountered; however the conventional BFS-based cement compositions still suffer from undesired shrinkage problems that are addressed by the use of aplite according to the invention. Setable cement compositions (aqueous or dry), but in particular non-self-setable compositions, comprising blast furnace slag and pulverulent aplite, e.g. at least 2% bwoc, more particularly at least 20% bwoc, especially at least 35% bwoc, more especially at least 40% bwoc, etc., e.g. up to 200% bwoc or up to 400% bwoc, form a further aspect of the invention.

Viewed from this aspect the invention provides a setable cement composition (aqueous or dry), but in particular a non-self-setable composition, comprising blast furnace slag and pulverulent aplite and optionally carbon fibres.

Viewed from a yet further aspect the invention provides the use of aplite in constructing or treating subsurface fluid extraction or introduction wells. Viewed from a still further aspect the invention provides an optionally sealed, fluid extraction or introduction well comprising a bore-hole having at least one depth therein an annular, borehole well-lining comprising a set-cement produced using a pulverulent aplite and optionally carbon fibre containing cement composition, particularly a composition as described herein.

The cement compositions of the invention may also be used for other subterranean cementing applications where a reduced cement shrinkage is desired, e.g. for plugging or filling crevices in rock or for the lining of other subterranean volumes such as storage volumes, pipes or tunnels. Such applications are also deemed to form part of the present invention.

The cement compositions of the invention may be applied down-hole by procedures and equipment conventional in the art for the down-hole application of setable cement compositions, e.g. non self-setting cement compositions.

The products and processes of the invention will now be illustrated further with reference to the following non-limiting Examples.

EXAMPLE 1

Aplite-Containing Cement Composition

A dry cement composition was prepared by mixing 100 parts by weight Class G Portland cement (from Norcem) with 50 parts by weight pulverulent aplite (sieved to a particle size of 75 µm or less) from Finnvolldalen, Norway (content $SiO_2$ 79.20%; MgO 0.11%; $Fe_2O_3$ 0.20%; $Na_2O$ 3.0%; $Al_2O_3$ 11.10%; $K_2O$ 3.90%; $TiO_2$ 0.02%; CaO 1.29%; $P_2O_5$ 0.1%).

To this was added 62.01 L/100 kg fresh water.

The mixture was cured in a high pressure/high temperature consistometer at 5000 psi and 150° C. The volumetric shrinkage observed was 0.7%.

Compressive strength, measured in an ultrasonic cement analyser, at 3000 psi and 150° C. (according to the API Recommended Practice for Testing Well Cements, 22nd Edition, 1997) was as set out in Table 1 below:

TABLE 1

| Time (hours:minutes) | Strength (psi) |
| --- | --- |
| 1:43 | 50 |
| 2:50 | 500 |
| 24:00 | 3480 |
| 48:00 | 3260 |

EXAMPLE 2

Aplite-Free Cement Composition (Comparative)

A cement composition was prepared by adding 45.55 L/100 kg fresh water to Class G Portland cement from Norcem. The mixture was cured and tested as in Example 1 showing a volumetric shrinkage of 3.4% and compressive strength as in Table 2 below:

TABLE 2

| Time (hours:minutes) | Strength (psi) |
| --- | --- |
| 1:50 | 50 |
| 2:39 | 500 |
| 24:00 | 3296 |

EXAMPLE 3

Aplite-Containing Cement Composition

A dry cement composition was prepared as in Example 1 but using 40 parts by weight of the aplite. This was mixed with 58.72 L/kg fresh water and cured and tested as in Example 1. The composition showed a volumetric shrinkage of 1.2% and compressive strength as in Table 3 below:

TABLE 3

| Time (hours:minutes) | Strength (psi) |
|---|---|
| 1:44 | 50 |
| 2:52 | 500 |
| 24:00 | 3227 |
| 48:00 | 2560 |

The cement compositions of Examples 1 and 3 may be formulated and applied down-hole using conventional well-cement application equipment.

EXAMPLE 4

Crushing and Shrinkage Tests

Cement compositions as set out in Table 4 were prepared and tested using an ultrasonic cement analyser as in Example 1.

TABLE 4

| Composition | Test Time (hours) | Test Temperature (°C.) | Final Strength (psi) | Crush Test (psi) | Shrinkage (%) |
|---|---|---|---|---|---|
| Norcem G | 24 | 150 | 3294 | — | — |
| Norcem G | 24 | 175 | 1000 | — | 3.4 |
| Norcem G | 68 | 175 | 1000 | — | 3.4 |
| Norcem G | 24 | 20 | 880 | — | — |
| Norcem G + 35% Silica | 24 | 150 | 3962 | — | — |
| Norcem G + 35% Silica | 24 | 175 | 3700 | 6939 | 0.5 |
| Norcem G + 35% Silica | 68 | 175 | 3300 | 6939 | 0.5 |
| Norcem G + 35% Silica | 24 | 150 | 3200 | — | 1.2 |
| Norcem G + 35% Silica | 68 | 150 | 2600 | — | 1.2 |
| Norcem G + 35% Silica | 24 | 20 | 900 | — | — |
| Norcem G + 35% Silica | 68 | 20 | 1772 | — | — |
| Norcem G ≠ + 10% Aplite | 24 | 150 | 2289 | — | — |
| Norcem G ≠ + 15% Aplite | 24 | 150 | 1432 | — | — |
| Norcem G ≠ + 40% Aplite | 24 | 150 | 2905 | — | — |
| Norcem G ≠ + 40% Aplite | 24 | 175 | 1400 | — | 3 |
| Norcem G ≠ + 40% Aplite | 68 | 175 | 1200 | — | 3 |
| Norcem G ≠ + 50% Aplite | 24 | 175 | 2200 | 1734 | 3 |
| Norcem G ≠ + 50% Aplite | 68 | 175 | 2000 | 1734 | 3 |
| Norcem G + 40% Aplite | 24 | 150 | 3200 | — | 1.2 |
| Norcem G + 40% Aplite | 68 | 150 | 2600 | — | 1.2 |
| Norcem G + 50% Aplite | 24 | 150 | 3450 | — | 0.7 |
| Norcem G + 50% Aplite | 68 | 150 | 3200 | — | 0.7 |
| Norcem G + 75% Aplite | 24 | 150 | 5000 | 8270 | 1.2 |
| Norcem G + 75% Aplite | 68 | 150 | 4316 | 8270 | 1.2 |
| Norcem G + 100% Aplite | 24 | 150 | 5800 | — | 0.7 |
| Norcem G + 100% Aplite | 68 | 150 | 5438 | — | 0.7 |
| Norcem G + 150% Aplite | 24 | 150 | 8000 | 8965 | 0.2 |
| Norcem G + 150% Aplite | 68 | 150 | 7069 | 8965 | 0.2 |
| Norcem G + 75% Aplite | 24 | 20 | 1600 | — | — |
| Norcem G + 75% Aplite | 48 | 20 | 3963 | — | — |
| Norcem G + 150% Aplite | 24 | 20 | 4000 | — | — |
| Norcem G + 150% Aplite | 48 | 20 | 5662 | — | — |

* % for silica is bwoc, i.e. relative to the Norcem G
≠ The aplite used in these tests was inhomogeneous drilling dust. The aplite used in the remaining tests had a particle size of less than 75 μm.

These results show that relatively high quantities of aplite, especially that with a particle size below 75 μm, may be used with advantage, even at low temperatures such as cause problems when using traditional cements in deep water.

EXAMPLE 5

Carbon Fibre Reinforced Cement

A cement composition may be prepared using Norcem G cement mixed with 150% bwoc aplite (particle size below 75 μm), 0.1-0.3% bwoc (e.g. 0.2% bwoc) carbon fibre and 94 L/100 kg fresh water. The carbon fibre will typically have a fibre length of 5 to 50 mm, e.g. 10 to 40 mm.

The invention claimed is:

1. A method of well construction or treatment which comprises introducing a setable cement composition down a borehole, characterized in that said composition contains pulverulent aplite.

2. The method as claimed in claim 1 wherein said cement is a cement composition comprising at least 30% by weight of cement (bwoc) pulverulent aplite on a dry solids basis.

3. The method as claimed in claim 1 wherein said setable cement is a non-self-setable cement and wherein an activator is introduced into said borehole separately from said setable cement.

4. The method as claimed in claim 1 wherein said cement is a cement composition containing at least 100% bwoc of pulverulent aplite on a dry solids basis.

5. The method as claimed in claim 1 wherein said cement is a cement composition containing aplite having a particle size of less than 200 μm.

6. The method as claimed in claim 1 wherein said cement is a cement composition containing at least 100% bwoc of pulverulent aplite on a dry solids basis and containing aplite having a particle size of less than 200 μm.

7. The method as claimed in claim 1 wherein the silicon content of said aplite is at least 68 wt %, expressed as oxide content.

8. The method as claimed in claim 1 further containing a non-aplite silicate wherein the weight ratio of non-aplite silicate to aplite is in the range 2:98 to 70:30.

9. The method as claimed in claim 1 wherein said cement comprises a cement base comprising portland cement.

10. The method as claimed in claim 1, wherein the composition further contains carbon fibres.

11. The method as claimed in claim 10, wherein said composition is a non-self-settable composition and wherein an activator is introduced into said borehole separately from said composition.

12. A cement composition comprising from at least 30% by weight to 400% of cement (bwoc) pulverulent aplite on a dry solids basis.

13. A cement composition as claimed in claim 12 containing at least 100% bwoc of pulverulent aplite on a dry solids basis.

14. A cement composition as claimed in claim 12 containing aplite having a particle size of less than 200 μm.

15. A cement composition as claimed in claim 12 containing aplite having a particle size of less than 100 μm.

16. A cement composition as claimed in claim 12 comprising a cement base comprising portland cement.

17. A cement composition, as claimed in claim 12, further comprising blast furnace slag and pulverulent aplite.

18. A cement composition as claimed in claim 12 wherein the silicon content of said aplite is at least 68 wt %, expressed as oxide content.

19. A cement composition as claimed in claim 12 further containing a non-aplite silicate wherein the weight ratio of non-aplite silicate to aplite is in the range 2:98 to 70:30.

20. A cement composition as claimed in claim 12 wherein said set cement composition has a shrinkage on setting of less than 3% by volume.

21. A set cement formed from a cement composition as claimed in claim 12 wherein said set cement has a permeability of no more than 0.0005 mD at a density of 1.9 SG.

22. A set cement formed from a cement composition as claimed in claim 12 wherein said set cement has a permeability of no more than 0.0003 mD at a density of 1.9 SG.

23. A cement composition as claimed in claim 12 containing at least 100% bwoc of pulverulent aplite on a dry solids basis and containing aplite having a particle size of less than 200 μm.

24. A cement composition as claimed in claim 12 containing at least 100% bwoc of pulverulent aplite on a dry solids basis and containing aplite having a particle size of less than 100 μm.

25. A cement composition as claimed in claim 12, wherein said composition further comprises carbon fibres.

26. A cement composition as claimed in claim 25, wherein said carbon fibres are between 0.1 cm and 10 cm in length.

27. A composition as claimed in claim 25, wherein the amount of carbon fibres added per $m^3$ of cement mix is 0.1 kg to 10 kg.

28. A fluid extraction or introduction well comprising a bore-hole having at at least one depth therein an annular, borehole well-lining comprising a set-cement produced using a pulverulent aplite containing cement composition.

29. A well as claimed in claim 28 wherein said cement composition is a cement composition comprising at least 30% by weight of cement (bwoc) pulverulent aplite on a dry solids basis.

30. The fluid extraction or introduction well of claim 28, wherein the well is sealed.

31. A cement composition comprising pulverulent aplite and carbon fibres.

32. A cement composition as claimed in claim 31, wherein said carbon fibres are between 0.1 cm and 10 cm in length.

33. A cement composition as claimed in claim 31, wherein the amount of carbon fibres added per $m^3$ of cement mix is 0.1 kg to 10 kg.

34. A cement composition as claimed in claim 31, further comprising blast furnace slag and pulverulent aplite.

35. A cement composition as claimed in claim 31, wherein the silicon content of said aplite is at least 68 wt. %, expressed as oxide content.

36. A cement composition as claimed in claim 31, further comprising a non-aplite silicate wherein the weight ratio of non-aplite silicate to aplite is in the range of 2:98 to 70:30.

37. A cement composition as claimed in claim 31, wherein said cement composition has a shrinkage on setting of less than 3% by volume.

38. A set cement formed from a cement composition as claimed in claim 31, wherein said set cement has a permeability of no more than 0.0005 mD at a density of 1.9 SG.

39. A set cement formed from a cement composition as claimed in claim 31, wherein said set cement has a permeability of no more than 0.0003 mD at a density of 1.9 SG.

40. A fluid extraction or introduction well comprising a borehole having at least one depth therein an annular, borehole well comprising a set-cement using a pulverulent aplite and carbon fibre containing cement composition.

41. The fluid extraction or introduction well of claim 40, wherein said well is sealed.

* * * * *